US011457643B2

(12) United States Patent
Garric et al.

(10) Patent No.: US 11,457,643 B2
(45) Date of Patent: Oct. 4, 2022

(54) METHOD FOR MANUFACTURING A CHEESE-BASED FOOD PRODUCT, ADVANTAGEOUSLY A CHEESE, CHEESE SPECIALTY, OR CHEESE SUBSTITUTE

(71) Applicants: INSTITUT NATIONAL DE LA RECHERCHE AGRONOMIQUE—INRA, Paris (FR); INSTITUT SUPERIEUR DES SCIENCES AGRONOMIQUES, AGROALIMENTAIRES, HORTICOLES ET DU PAYSAGE, Rennes (FR)

(72) Inventors: Gilles Garric, Rennes (FR); Joelle Leonil, Rennes (FR); Romain Jeantet, Rennes (FR); Frederic Gaucheron, Betton (FR); Pierre Schuck, Chartres de Bretagne (FR); Sylvie Lortal, Rennes (FR)

(73) Assignees: INSTITUT NATIONAL DE RECHERCHE POUR L'AGRICULTURE, L'ALIMENTATION ET L'ENVIRONNEMENT, Paris (FR); INSTITUT SUPERIEUR DES SCIENCES AGRONOMIQUES, AGROALIMENTAIRES, HORTICOLES ET DU PAYSAGE, Rennes (FR)

( * ) Notice: Subject to any disclaimer, the term of this patent is extended or adjusted under 35 U.S.C. 154(b) by 272 days.

(21) Appl. No.: 15/541,255

(22) PCT Filed: Dec. 28, 2015

(86) PCT No.: PCT/FR2015/053762
§ 371 (c)(1),
(2) Date: Jun. 30, 2017

(87) PCT Pub. No.: WO2016/108024
PCT Pub. Date: Jul. 7, 2016

(65) Prior Publication Data
US 2017/0347677 A1 Dec. 7, 2017

(30) Foreign Application Priority Data
Dec. 30, 2014 (FR) ...................................... 1463439

(51) Int. Cl.
A23C 19/05 (2006.01)
A23L 27/20 (2016.01)
A23C 19/028 (2006.01)
A23C 20/02 (2021.01)

(52) U.S. Cl.
CPC ........ *A23C 19/054* (2013.01); *A23C 19/0285* (2013.01); *A23C 19/05* (2013.01); *A23C 20/02* (2013.01); *A23L 27/206* (2016.08); *A23C 2220/208* (2013.01)

(58) Field of Classification Search
CPC ................ A23C 19/054; A23C 27/206; A23C 19/0285; A23C 19/05; A23C 20/02; A23C 2220/208; A23L 27/206
USPC ..... 426/34, 36, 38, 39, 40, 42, 43, 580, 582
See application file for complete search history.

(56) References Cited

U.S. PATENT DOCUMENTS 7,674,489 B2   3/2010   Moran et al.

FOREIGN PATENT DOCUMENTS

| EP | 1535519 | * | 6/2005 |
| WO | WO 2005/046344 | * | 5/2005 |
| WO | 2008/095495 A1 | | 8/2008 |

OTHER PUBLICATIONS

Technical specification No. B3-07-09 applicable to milks and dairy products (date of publication: Nov. 2009) (Legal Affairs Department—France) (English machine translation provided).
Alain Branger, "Manufacture of food products via fermentation: engineering" Techniques of the Engineer—f3501, Sep. 10, 2014 (English machine translation provided).
Decree No. 2007-628 of Apr. 27, 2007, pertaining to cheeses and cheese specialities (Ministry of the Economy and of Finance—France) (English machine translation provided).
Decree No. 2013-1010 of Nov. 12, 2013, pertaining to cheeses and cheese specialities (Ministry of the Economy and of Finance—France) (English machine translation provided).
Codex Alimentarius, International Food Standards, "General Standard for Cheese: CXS 283-1978" 2018.

(Continued)

*Primary Examiner* — Leslie A Wong
(74) *Attorney, Agent, or Firm* — Nixon & Vanderhye

(57) ABSTRACT

Disclosed is a method for manufacturing a cheese-based food product, advantageously a cheese, cheese specialty, or cheese substitute, the method including: a) a step A) of providing at least one flavoring matrix, the consistency of which ranges from liquid to pasty, the flavoring matrix resulting from a step of cultivating at least one flavor producing microorganism in a culture medium, the step A) also providing a texture matrix, the consistency of which ranges from liquid to pasty, the texture matrix being suitable for providing the texture of the food product; then b) a step B) of mixing the at least one flavoring matrix with the at least one texture matrix; then c) a texturing step C), during which the mixture from mixing step B is subjected to physiochemical texturing conditions that are adjusted according to the final texture sought for the cheese-based food product.

8 Claims, 1 Drawing Sheet

(56) References Cited

OTHER PUBLICATIONS

Goudedranche, H. et al. "Utilization of the new mineral UF membranes for making semi-hard cheeses", Desalination, 35 (1980) 243-258.
Karlsson, A.O. et al., "Influence of pH and NaCl on rheological properties of rennet-induced casein gels made from UF concentrated skim milk," International Dairy Journal 17 (2007) 1053-1062.
Maubois, J.L. and Mocquot, G., "Application of Membrane Ultrafiltration to Preparation of Various Types of Cheese," Journal of Dairy Science, vol. 58, No. 7, pp. 1001-1007, 1975.
McSweeney, P. et al., "Cheese: Chemistry, Physics & Microbiology" 2017, pp. 273-282.
Pouliot, Y., "Membrane processes in dairy technology—From a simple idea to worldwide panacea," International Dairy Journal 18 (2008) 735-740.
Waungana, A. et al., "Rennet coagulation properties of skim milk concentrated by ultraltration: effects of heat treatment and pH adjustment," Food Research International, vol. 31, No. 9, pp. 645-651, 1998.

\* cited by examiner

METHOD FOR MANUFACTURING A CHEESE-BASED FOOD PRODUCT, ADVANTAGEOUSLY A CHEESE, CHEESE SPECIALTY, OR CHEESE SUBSTITUTE

This application is a 371 of PCT/FR2015/053762, filed Dec. 28, 2015.

TECHNICAL FIELD THAT THE INVENTION RELATES TO

This invention relates to a method for manufacturing a cheese-based food product, in particular a cheese, cheese specialty or cheese substitute.

TECHNOLOGICAL BACKGROUND

In the field of the food industry, it is frequent to use microorganisms for the biotransformation of a raw material in such a way as to manufacture particular organoleptic characteristics and to obtain a finished product corresponding to the request of the consumer.

This biotransformation is in particular implemented for the manufacture of cheese-based food products, i.e. advantageously cheeses, cheese specialties or cheese substitutes.

Cheeses (and in particular soft cheeses which are among the most typical of the French cheese production) are traditionally obtained by transforming the milk into a gel or coagulum, thanks to the adding of a coagulating enzyme (rennet) and via lactic acidification.

The interstitial liquid of the gel, i.e. the whey, is progressively expulsed via syneresis (also known as "draining").

During this syneresis, the gel is concentrated little by little into these main elements (fat and proteins, with a certain quantity of mineral substances), to end up as curd which acquires the characteristic shape, consistency and composition of the desired cheese.

In the case of ripened cheeses, a flora of microorganisms then develops in the curd in such a way as to produce the sought flavours: this is ripening.

This phase of ripening is generally essential for conferring its aromatic qualities to the final product.

However, in practice, this phase of ripening takes place over a long period of time (often several weeks, even several months).

Furthermore, in an industrial environment, this traditional approach has a certain number of disadvantages from the moment when it is suitable to adjust and render uniform the step of ripening, as well as reducing its duration.

Alternative methods for manufacturing have been developed in such a way as to overcome these disadvantages.

In document U.S. Pat. No. 7,674,489, a flavouring agent is obtained by the culture of micro-organisms (mixture of lactic and flavouring bacteria) on a milk retentate.

After the development of flavours, the microorganisms are destroyed before the introduction of the flavouring agent in a texture matrix chosen from a fresh cheese or a cream cheese.

The final consistency is determined by the consistency of the texture matrix.

Consequently, the method that is the object of this document U.S. Pat. No. 7,674,489 does not make it possible to obtain cheeses of which the consistency of the cheese can be chosen so as to be in a range extending from a soft cheese to a hard cheese.

Document WO-2008/095495 describes a process for the obtaining of a cheese of the "processed cheese" ou "melted cheese" type.

This document WO-2008/095495 recommends mixing a curd with a flavouring ingredient (for example a ripened cheese, a cheese powder or a fermented milk).

The gel of the curd must then be destructured, in particular by the application of a high temperature (advantageously between 50° C. and 70° C.), for the homogeneous and intimate mixture of the ingredients.

This mixture is then adjusted in pH in order to obtain a homogeneous mass of cheese that can be transformed into a block for the purposes of packaging.

The product obtained as such consists in a cheese that has a flexible and creamy consistency.

But, the method object of this document WO-2008/095495 requires an additional step of destructuring the coagulum obtained beforehand, in order to ensure the homogeneous mixture of the matrices.

In this context, there is a need for a method that makes it possible to manufacture a cheese-based food product of which the taste and the texture are obtained at the end of the manufacturing and can be chosen as such in an entire range, and this without requiring a final ripening or requiring an additional step of destructuring a coagulum obtained beforehand (in particular via the use of heat and/or melting salts).

OBJECT OF THE INVENTION

This invention as such relates to a method for manufacturing a cheese-based food product, for example of the cheese, cheese specialty or cheese substitute type.

The invention aims to reorganise the major phases of cheese technology, in order to optimize them according to a definition of the functionalities and functions of the finished product.

More precisely, this invention consists in particular in outsourcing the production of flavours, by optimising the triptych:
- flavouring microorganisms (better producers of flavourings and aromatic balancing),
- suitable culture medium (milk, cream, plant juices, etc.), and
- optimum development conditions (temperature, pH, time, oxygenation, stirring, etc.).

The method according to the invention consists in decoupling the carrying out of the flavouring matrix and the carrying out of the texture matrix, then in assembling them in suitable proportions, before texturing the mixture in suitable physical-chemical conditions.

In this respect, the manufacturing method according to the invention comprises the following steps:
a) a step of providing:
  at least one flavouring matrix, in a consistency that ranges from liquid to pasty, said flavouring matrix resulting from a step of cultivating at least one flavour producing microorganism in a culture medium,
  at least one texture matrix, in a consistency that ranges from liquid to pasty, said texture matrix being suitable for providing the texture of said food product,
  said at least one texture matrix comprises between 5% and 25% (preferably between 9% and 25%) by weight in proteins and between 3% and 30% by weight in fat,
  at least some of said proteins consist of coagulating proteins which are able to coagulate in order to form a gel, then b) a step of mixing of said at least one flavouring matrix and of said at least one texture matrix of which the coagulating proteins have not been subjected to a prior coagulation, then c) a texturing step, during which the mixture coming from the step B) is subjected to physicochemical texturing conditions which are intended to ensure the coagulation of said coagulating proteins in order to form said gel, said physical-chemical conditions of texturing are adapted according to the final texture sought for said food product.

Such a method has the interest of making it possible to obtain the final food product, with a wide range of flavours and textures which are suited as such right from the end of the manufacturing method, sparing as such a final phase of ripening.

The cost of manufacturing such a cheese-based food product is as such much less than that in particular of a "traditional cheese, since the production of flavourings and the texturing can be carried out in a few days (not in a few weeks or even in a few months).

The method according to the invention is in addition based on a coagulation solely after the mixing of the matrices, which avoids the problems attached to process cheeses (in particular destructuring of the gel and use of the melting salts).

The method according to the invention as such comprises a single and unique structuring of proteins (texturing), advantageously after a phase of concentration in order to obtain the texture matrix, which as such avoids the solubilisation of a coagulum for the purpose of the step of mixing with the flavouring matrix.

This technique allows in addition for better regularity in the method (the production of the flavourings is outsourced), a larger latitude as to the types of flavourings products and provided, and a simplification in the method (the production of the flavourings is decoupled in relation to acidification).

According to other characteristics for carrying out, able to be taken in combination or separately from one another:
- the texture matrix consists in a retentate which comes from a technique of filtering a dairy product and/or a plant juice and wherein is retained in particular at least one portion of the proteins of the dairy product and/or of the plant juice; in this case, the texture matrix advantageously consists in a pre-cheese liquid, retentate of the filtration of a milk wherein are retained in particular the proteins of the milk;
- during the texturing step C), the physical-chemical conditions of texturing are chosen from among the temperature, pH, the dose of coagulants and the dose of NaCl; in this case, preferably, the texturing step C) is adjusted with the following physical-chemical conditions of texturing: a pH between 4 and 6.5, preferably between 4.5 and 5.7, a temperature between 15° C. and 50° C., preferably between 20 and 40° C., a concentration in salt between 0.1% and 2%, preferably between 0.7 and 0.9%, and, for a dairy product, a dose of coagulant (rennet extract or protease) between 0 and 50 g/100 L, preferably between 15 and 30 g/100 L;
- during the step of mixing B), the flavouring matrix is between 0.5 and 50% by weight, more preferably 0.5 to 10% by weight, of the total mixture, limits included;
- the method can comprise, following the texturing step C), a step of applying at least one surface maturation microorganism;
- the step of providing A) consists of a method for the production of said flavouring matrix, comprising said step of culture of at least one flavour producing microorganism in a culture medium, and/or a method for the production of said texture matrix in physical-chemical conditions intended to prevent the gel from forming; preferably, for the manufacture of a cheese of the ripened type, during the method of production of the flavouring matrix, the flavouring microorganisms include ripening microorganisms; again in this case, the dairy culture medium consists advantageously of milk or a product obtained from milk chosen from cream, cheese-making wheys, filtration permeates; alternatively, for the manufacture of a cheese substitute, during the method of production of the flavouring matrix, the culture medium consists advantageously of a plant juice, for example a juice chosen from soy juice, lupin juice, oat juice, rice juice or a mixture of at least two of said juices; generally, the step of culture is more preferably implemented over a period of 1 to 4 days;
- during the step of mixing B), said at least one flavouring microorganism is alive.

This invention further relates to a cheese-based food product, advantageously a cheese, cheese specialty or cheese substitute, coming from a manufacturing method according to the invention.

DETAILED DESCRIPTION OF THE INVENTION

This invention will be further illustrated, without being limited in any way, by the following particular embodiments in relation with the annexed figures wherein.

Generally, this invention relates to a method for manufacturing a cheese-based food product.

The manufacturing method according to the invention has the interest of making it possible to obtain flavourings and the texture of the final product at the end of this method.

The cheese-based food product according to the invention, comprising advantageously flavourings of ripened cheese, can as such be consumed shortly after it is manufactured, without requiring the maintaining thereof for a lapse of time at a temperature and in conditions required for the unfolding of the characteristic biochemical and physical changes of the flavouring microorganisms.

Figure 1:
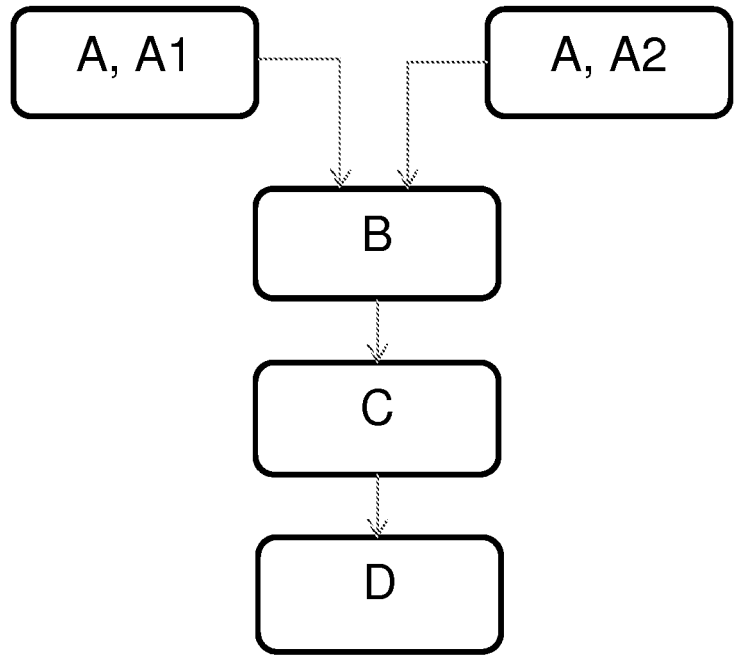
FIG. 1 is a block diagram showing the main steps of the method according to the invention, for the manufacture of cheese-based food products.

For this, such as shown diagrammatically in FIG. 1, this manufacturing method comprises the following consecutive steps:

A) a step of providing:

A1) at least one flavouring matrix, in a consistency (or shape) ranging from liquid to pasty, said flavouring matrix resulting from a step of cultivating at least one flavour producing microorganism in a culture medium, and A2) at least one texture matrix, in a consistency (or shape) ranging from liquid to pasty, said texture matrix being suitable for providing the texture of said food product, B) a step of mixing said at least one flavouring matrix and of said at least one texture matrix, then C) a texturing step, during which the mixture coming from the step of mixing B) is subjected to physicochemical texturing conditions which are adapted according to the final texture sought for said food product, and D) optionally a step of applying at least one surface maturation microorganism.

General Definitions

In the framework of this invention, a "cheese-based food product" is advantageously a substance or a product that is transformed, intended to be swallowed by a human being, which consists of a cheese strictly speaking or which is intended to replace such a cheese.

Such a cheese-based food product encompasses advantageously a cheese-based food product, cheese specialty or cheese substitute.

A "cheese" is a product that is fermented or not, ripened or not, obtained from materials of an exclusively dairy origin, coagulated entirely or partially before draining or after partial elimination of the aqueous portion.

A "dairy specialty" is a dairy product other than cheeses, white cheeses and blue cheeses, fermented or not, ripened or not, prepared using materials of an exclusively dairy origin, to which other materials coming exclusively from milk can be added, used alone or in a mixture.

A "cheese substitute" is a food product intended to replace the cheese, manufactured mainly using a plant raw material (cereal juice, of legume, etc. for example of the soy juice, oat juice, almond juice, etc. type).

Such cheese substitutes are also called "vegan cheeses", "plant-based cheeses" or "analogous cheeses".

In an individual, the consumption of such a cheese-based food product will lead to a perception of a flavour.

The "flavour" corresponds to all of the olfactory, tastes and trigeminal sensations perceived during the tasting of a food product.

These sensations allow for the perception of different orosensory stimuli:
 flavours, also called "sapid compounds" or "sapid stimuli" (in particular associated with the taste sensation),
 flavourings, also called "odorous compounds" or "olfactory stimuli" or "stimuli odorants" (in particular associated with the olfactory sensation), and/or
 trigeminal compounds (in particular associated with the somesthesic sensation and more precisely the trigeminal perception).

In this invention and with a concern for simplification, the notion of "flavouring" will be used in a manner that is equivalent to the notion of flavour, as such encompassing the notion of flavouring strictly speaking but also the notions of flavour and of trigeminal compounds.

"Flavour" means in particular a stimulus perceived by the taste receptors located on the tongue.

The perception dynamics of the flavour is in particular governed by the temporal release of non-volatile compounds that are dissolved in the saliva.

"Flavour" means in particular the basic flavours: sweet, salty, acidic, bitter and umami. It also means the sensation of fat (in particular fatty acids such as oleic acid).

"Flavouring" means the perception linked to the release dynamics of odorous volatile molecules in the orosensory sphere.

Such olfactory stimuli consist generally of volatile molecules that must be released from the product in order to reach the olfactory receptors located in the nasal cavity.

When the compound of interest is in the mouth, this perception takes place in particular through the "back of the throat" or "retronasal passage".

And furthermore, "texture" or "consistency" means a set of rheological and structural properties (geometrical and of surface) of the cheese-based food product, perceptible by the mechanoreceptors, tactile receptors and, optionally, visual and auditory receptors of the consumer.

In this invention, the consistency of the cheese-based food product is advantageously of the pasty type.

This notion of pasty advantageously encompasses a panel of the following consistencies: hard pasty, semi-hard pasty, semi-soft pasty, soft pasty, spreadable pasty.

The various notions of cheese technologies, including consistency, are described in the following documents:
 Standard FAO/WHO no. A-6—Cheese (1978, modified in 1990);
 Technical specification no. B3-07-09 applicable to milks and dairy products (date of publication: November 2009) (Legal Affairs Department-France);
 Decrees no. 2007-628 of 27 Apr. 2007 and no. 2013-1010 of 12 Nov. 2013, pertaining to cheeses and cheese specialties (Ministry of the Economy and of Finance-France).

Generally, according to the invention, all of the ranges indicated are with limits included.

On the Flavouring Matrix

The flavouring matrix, in a consistency that ranges from liquid to pasty, constitutes a product which is intended to supply the flavourings of interest to the final product.

This flavouring matrix is obtained through a method of culture of at least one flavour producing microorganism, in a culture medium, advantageously a dairy culture medium (preferably for cheeses and cheese specialties) or a plant culture medium (preferably for cheese substitutes).

The flavouring microorganisms in question, also called "aromatic yeasts", are chosen from microorganisms able to produce flavourings which are sought for the final cheese-based food product.

In the case of a culture medium (dairy or plant juice), the flavourings are advantageously developed by the release of terminal products of a proteolysis (amino acids) and/or of a lipolysis and/or of a transformation of sugars.

These flavourings of interest consist advantageously in flavourings encountered in the cheese, more preferably also chosen from the following compounds:
 oct-1-en-3-ol (mushroom),
 2-phenylethanol and phenylacetaldehyde (floral note),
 1,6-dimethoxybenzene and methylic ester of cinnamic acid (hazelnut note),
 2,4-dithiapenthane, 2,4,5-trithiahexane and 3-methylthio-2,4-dithiapentane (allium note),
 methyl sulphide, dimethyl disulphide, 3-methylthiopropanal and methanethiol (Epoisse, Vacherin, Pont-l'Evêque, Limburger), sometimes indole and propionic acid and diacetyl (Swiss cheese).

Such flavourings are as such obtained by the culture of flavouring microorganisms (or "microorganism of aromatic interest"), which encompasses the bacteria, yeasts or moulds.

These flavouring microorganisms advantageously include ripening microorganisms (or "ripening flora" or "ripening ferments").

Ripening microorganisms include moulds and/or yeasts and/or bacteria that usually develop in the cheese, even on the surface of the cheeses with a mould rind, washed or salted.

These ripening microorganisms include:
- moulds, such as *Penicillium camemberti* or *Penicillium roqueforti*;
- yeasts, belonging in particular to the genera *Saccharomyces*, *Candida* (*Candida utilis*), *Geotrichum* (for example *Geotrichum candidum*) and *Debaryomices hanseni*; and
- bacteria, such as propionic bacteria (*Propionibacterium*), and various bacteria referred to as gram positive (*Lactobacillus*, more preferably *Lactobacillus rhamnosus*, *Lactobacillus paracasei*, *Lactobacillus fermentum*); among bacteria, mention can also be made of *Staphylococcus xylosus*, *Brevibacterium linens* or *casei*.

The flavouring microorganisms can also be chosen for example from *Hafnia alvei*, *Yarrovia lipolytica*.

Such flavouring microorganisms can also be chosen from microorganisms proposed by the companies CHR HANSSEN (for example in the range DVS™) STANDA (for example in the range PAL™) or DANISCO (for example in the range CHOOZIT™ Cheese Cultures).

The flavouring microorganisms implemented come from a species or from a combination of at least two species that belong to the same kingdom or different kingdoms.

Each species of microorganisms furthermore, comes from a single strain or from a combination of at least two strains.

More generally, flavouring microorganisms can also be chosen from any other microorganism which is able to produce flavourings via biotransformation and which is encountered in the field of the food industry (Techniques of the Engineer-f3501—"Manufacture of food products via fermentation: engineering"—Oct. 9, 2014—Alain BRANGER).

For example, flavouring microorganisms can also consist of acidifying lactic bacteria and producers of flavourings such as *Lactococcus lactis* ssp *lactis* and ssp *cremoris* or var *diacetylactis*, *Lactococcus cremoris*, *Streptococcus thermophilus*, *Leuconostocs mesenteroïdes* ssp *cremoris*.

The dairy culture medium constitutes a substrate which is chosen from milk and its derivatives: cream, cheese-making wheys or filtration permeates (ultrafiltration, microfiltration, nanofiltration).

"Milk", advantageously means a milk coming from a ruminant, for example cow, goat, ewe or buffalo.

The milk can have different forms: whole milk, semi-skimmed milk, skimmed milk; the milk can also have the form of raw milk or pasteurised milk, microfiltered fresh milk, sterilised milk, UHT sterilised milk.

Cream is a milk containing at least 30 g of fat (coming exclusively from milk) for 100 g of total weight.

Cheese-making wheys consist of a co-product of the cheese manufacture, from the manufacture of fresh, soft, pressed and cooked cheeses.

The filtration permeates consistent in a co-product during the concentration of a milk on a filter membrane (ultrafiltration, microfiltration or nanofiltration).

The plant culture medium constitutes a substrate which is chosen from plant juices, for example soy juice, rice juice, almond juice, etc.

Figure 2:
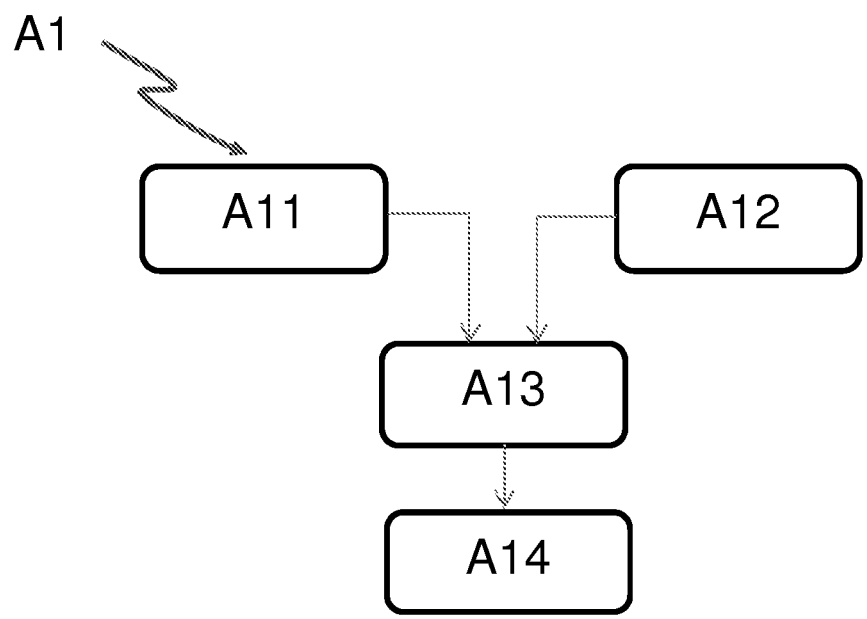
FIG. 2 is a block diagram showing the main steps of the method for manufacturing a flavouring matrix used in the manufacturing method according to FIG. 1.

In practice, such as shown in FIG. 2, flavouring microorganisms A11 are incorporated into the culture medium A12 during a step of mixing A13, then allowing the implementation of a step of culture A14 in optimal physical-chemical conditions until the obtaining of the flavouring matrix of interest.

The physical-chemical conditions of the step of culture A14, in particular the temperature, pH, oxygenation and stirring, are adapted in particular in order to obtain an optimum production of the flavourings via the flavouring microorganisms.

The physical-chemical conditions in question are for example presented in the document Techniques of the Engineer-f3501—"Manufacture of food products via fermentation: engineering"—Oct. 9, 2014—Alain BRANGER.

For example, during the step of culture A14, the flavouring matrix can be carried out in a tank or in a fermenter, according to the desired aromatic typicity.

The duration of this step of culture A14 is advantageously about 1 to 4 days.

In the dairy culture medium, enzymes, additional substrates can also be added as a function of the microorganisms implemented.

The flavouring matrix obtained as such (at the end of the step of culture A14) has a non-solid consistency, for example liquid, semi-liquid, semi-pasty or pasty.

This flavouring matrix contains a concentrate of the flavourings sought (or more generally the flavours), which are produced by the flavouring microorganisms through the biotransformation of the culture medium.

On the Texture Matrix

The texture matrix is chosen from the adapted raw materials to be carried out the final texture of the cheese-based food product.

Such a texture matrix comprises for this proteins and fat:
- between 5% and 25 by weight in proteins, more preferably 9% and 25% by weight in proteins, and
- between 3% and 30% by weight in fat.

Among the proteins of this texture matrix, at least some consist in proteins referred to as "coagulating", i.e. which are able to form a gel (protein gel) or "coagulum" during a process of coagulation.

The gelification of proteins is obtained advantageously from soluble proteins (ovalbumin, soy proteins, whey proteins, etc.).

In certain cases, acidification is required.

The addition of salts or of ions can increase the speed of gelification or the firmness of the gel obtained.

The coagulating proteins are advantageously chosen from the proteins able to gel without heating or at least without substantial heating (less than 50° C. and more preferably less than 40° C.):
- either enzymatically (casein micelle, fibrin, egg white proteins),
- or by the adding of ions (calcium and casein),
- or by an alkalinisation followed by a return to neutrality or to the pI of the protein (soy protein).

Alternatively, the coagulating proteins can also be chosen from proteins able to gel with heating (greater than 70° C.), i.e. proteins referred to as thermocoagulating.

In this texture matrix, proteins are in a "native" form, i.e. they were not subjected to a prior coagulation (without a prior step of texturing).

This texture matrix is therefore not subjected to a prior step of destructuring of a coagulum, in order to allow for its intimate mixture with the flavouring matrix.

Such a texture matrix is advantageously chosen from milk-based products ("diary" texture matrix), or of plant juice ("plant" texture matrix).

The texture matrix has a non-solid consistency, for example liquid, semi-liquid, semi-pasty or pasty.

"Milk-based product", means in particular milk as is, but also cream, buttermilk, wheys or filtration permeates.

For example, coagulating proteins are caseins, of which the native shape consists in a shape of casein micelles.

In order to form a gel, the rennet hydrolyses the kappa casein; two derivatives are obtained with this reaction: hydrophilic caseino-macro-peptide and electrically negative, and hydrophobic para-casein-kappa; the para-caseins-kappa will bind together thanks to electrostatic interactions, hydrogen bonds, hydrophobic as well as calcium bridges, resulting in said gel.

The milk-based product is advantageously standardised from a physical-chemical standpoint, in particular:
  for fat: level (fat rating), state (homogenised or not),
  in protein content: seric protein/casein ratio,
  lactose rating,
  from a mineral standpoint: calcium and phosphorus content.

The starting raw material can also be the object of a microbiological standardisation:
  through the bias of a thermal treatment (time/temperature pair), and
  a mechanical treatment, for example of the microfiltration type.

The starting raw material is advantageously concentrated by a filtration technique, up to a desired concentration factor (Volume concentration factor—"VCF") in such a way as to obtain an optimum texture (for example a VCF factor between 3 and 7).

The filtration technique implemented is advantageously chosen from the techniques of ultrafiltration, microfiltration, nanofiltration, associated or not with diafiltration.

The texture matrix obtained as such consists for example in a product that is commonly referred to as "liquid pre-cheese".

The method of obtaining this liquid pre-cheese, as well as its characteristics, are described for example in the documents:
  Maubois et al. "Application of Membrane Ultrafiltration to Preparation of Various Types of Cheese", Journal of Dairy Science, Vol. 58, no. 7, or
  Goudédranche et al. "Utilization of the new mineral UF membranes for making semi-hard cheeses", Desalination, 35 (1980) 243-258.

Such a liquid pre-cheese consists as such in a protein-enriched milk (casein and soluble proteins), forming a filtration retentate that comprises a protein content that is adapted to the desired cheese and which has the composition of a curd at the end of draining while still remaining liquid (without coagulation of its coagulating proteins).

The volume concentration factor of such a liquid pre-cheese is advantageously between 4 and 7.

The filtration operation is for this carried out on a semi-permeable membrane of which the permeability is such that only the soluble elements of the milk (i.e. substantially the lactose, and the soluble mineral salts and the non-protein nitrogen substances) pass through said membrane (for example in ultrafiltration).

This step of filtering is for example developed in the document Pouliot—International Diary Journal—18 (2008) 735-740.

For the purposes of information, the filtration operation is implemented in the following conditions:
  the ultrafiltration of which the cut-off threshold varies between 2,000 and 150,000 Da and the pressure applied between 2 and $10 \times 10^5$ Pa,
  the microfiltration of which the cut-off threshold is greater than 150,000 Da and the pressure applied between 0.2 and $1 \times 10^5$ Pa,
  the nanofiltration of which the cut-off threshold varies between 200 and 1000 Da and the pressure applied between 10 and $40 \times 10^5$ Pa.

This operation, for example of ultrafiltration, as such makes it possible to obtain two liquids:
  a first liquid passing through the membrane, called "filtrate" or "permeate", forming a sort of whey devoid of protein nitrogen substances as well as substances (caseino-macropeptides and glyco-macropeptides) that the rennet detaches from the casein during coagulation; and
  a second liquid retained by the membrane, forming the aforementioned retentate, forming the protein-enriched milk in proteins (casein and soluble proteins).

This liquid pre-cheese can optionally be adjusted in fat, in particular by adding cream.

Moreover, "plant juice based product" means in particular soy, oat, almond, pea, lupin, oat, rice, etc. juice.

The plant juice based product can consist in a mixture of at least two of these juices, preferably a soy juice with at least one other juice.

For example, the texture matrix comprises a mixture:
  soy juice with oat juice, of which advantageously the percentage by weight in oat juice is between 5 and 10%, and
  soy juice with lupin juice, of which advantageously the percentage by weight in lupin juice is between 35% and 45%.

Such as developed hereinabove, the starting raw material is advantageously concentrated by a filtration technique, until a desired concentration factor in such a way as to obtain an optimum texture (for example a VCF factor between 3 and 7).

The filtration technique implemented is advantageously chosen from the techniques of ultrafiltration, microfiltration, nanofiltration, associated or not with diafiltration.

Such a plant juice consists as such in a protein-enriched plant juice, forming a filtration retentate that comprises a protein content adapted to the sought cheese substitute.

The volume concentration factor of such a plant juice is advantageously between 4 and 7.

The filtration operation is for this carried out on a semi-permeable membrane of which the permeability is such that only the soluble elements of the juice pass though said membrane.

The plant juice can also be obtained from a flour put into suspension in a liquid (with for example a ratio of about 1/5) during an adapted time (for example 10 to 30 min), which is then filtered in order to obtain a concentrated plant juice forming the product with a plant juice base.

The starting product can also consist in a dairy-base product associated with a plant juice.

In this case, the ratio varies for example between 10% and 90% for a first constituent, in relation to the second constituent.

On the Step of Mixing

The texture matrix and the flavouring matrix are mixed in proportions as such (step B—FIG. 1).

For example, the flavouring matrix constitutes between 0.5 and 50% by weight, preferably between 0.5 and 10% by weight, of the total mixture.

More preferably, the mixture is maintained at a maximum temperature of 40° C.

The time and the type of mixture must be adapted to a perfect distribution of the flavouring matrix in the texture matrix.

For example, the mixture can be done in a scraped tank, in an exchanger with a scraped surface or in a static mixer.

In this mixture, various additives can be incorporated, for example authorised products such as colouring agents or acidity regulators.

In addition, this cheese-based food product is devoid of melting salts, which allow for the non-separation of the elements after the stopping of the stirring.

The main melting salts are sodium polyphosphates and orthophosphates, sodium citrate and citric acid.

On the Texturing Step

The mixture obtained at the end of the step of mixing B) is then the object of a texturing step C) which is adapted according to the final texture sought for the food product.

This method according to the invention as such comprises a texturing step solely after a step of mixing matrices.

Texturing consists in submitting the mixture to physical-chemical conditions of texturing which are adapted to form the gel or "the coagulum" by the bias of the aforementioned coagulating proteins.

"Texturing" as such encompasses two types of coagulations, alternative or complementary: lactic coagulation or acid coagulation (by fermentation or chemically) and the rennet coagulation (enzymatically).

More preferably, such a gel is advantageously constituted substantially of a gel of coagulating proteins (more preferably casein) retaining the fatty globules and a more or less substantial portion of the aqueous phase of the matrices.

The coagulating proteins pass as such, for the first time, from a non-coagulated form to a coagulated form.

The physical-chemical conditions of texturing, to which the mixture is submitted, are in particular chosen from:
 temperature,
 pH,
 dose of coagulant,
 concentration in salt, in particular the concentration in NaCl, and
 possibly a dose of texturing agent (gelling and/or thickening).

The adjusting of these texturing parameters can be done taking the following documents into account:
 Karlsson et al. "Influence of pH and NaCl on rheological properties of rennet-induced casein gels made from UF concentrated skim milk"—International Diary Journal 17 (2007) 1053-1062);
 Maubois et al. "Application of Membrane Ultrafiltration to Preparation of Various Types of Cheese", Journal of Dairy Science, Vol. 58, no. 7;
 Goudédranche et al. "Utilization of the new mineral UF membranes for making semi-hard cheeses", Desalination, 35 (1980) 243-258;
 Waungana et al. "Rennet coagulation properties of skim milk concentrated by ultrafiltration: effects of heat treatment and pH adjustment"—Food Research International, Vol. 31, No 9, pp 645-651, 1998.

In particular, in the case of a "plant" texture matrix, two modes of texturing are adapted:
 by acidification, using for example glucono-delta-lactone (GDL) and/or ferments, or
 by thermocoagulation, in the presence for example of calcium lactate or of calcium sulphate.

For example, and in a non-limiting manner, the doses of coagulants are from 2 to 5% calcium sulphate or from 3 to 10% calcium lactate or from 1 to 5% GDL.

In practice, for the various texture matrices, the following physical-chemical conditions of texturing are advantageously implemented according to the texture sought:
 a pH between 4 and 6.5, preferably between 4.5 and 5.7,
 a temperature between 15° C. and 50° C. (preferably between 20° C. and 40° C.), or optionally a temperature greater than 70° C. in the case of a thermocoagulation,
 a concentration in NaCl between 0.1% and 2%, preferably between 0.7% and 0.9%, and
 in the case of a dairy texture matrix, a dose of coagulant (in particular a rennet extract) between 0 g/100 L and 50 g/100 L, preferably between 15 g/100 L and 30 g/100 L, and optionally
 a dose of texturing agent (gelling and thickening) comprise, on the one hand, between 0 and 0.6 kg/100 L, preferably between 0.2 and 0.4 kg/100 L, of gelling agent and, on the other hand, from 0 to 4 kg/100 L, preferably between 1.5 and 2 kg/100 L of thickening agent.

The parameters hereinabove are in particular optimum in the case of a mixture of which the texture matrix is a liquid pre-cheese.

The adjustment of the pH can be obtained in various ways:
 adding D-gluconic delta-lactone (GDL) acid,
 adding milk or pre-acidified retentate,
 adding acidifying ferments,
 adding lactic acid.

This adjustment of the pH is advantageously carried out slowly and regularly, advantageously over a period of time between 20 min and 30 min.

If required, the texturing agents can be incorporated into the texture matrix, before the mixing thereof with the flavouring matrix.

These texturing parameters are in addition advantageously adjusted in such a way that the flavouring microorganisms remain alive.

In particular, the physical-chemical conditions of texturing can be adjusted in such a way as to allow for the obtaining of a cheese-based food product forming a paste of which the texture can be adjusted as such from a spreadable cheese to a hard cheese.

More precisely, these physical-chemical conditions of texturing can be adjusted in order to obtain a cheese of which the cheese comprises one of the following textures/hardnesses:
 a spreadable cheese,
 a soft cheese,
 a semi-soft cheese,
 a semi-hard cheese, and
 a hard cheese.

In other terms, the hardness results are within a range between 3 kg·f$^{-1}$ and 40 kg·f$^{-1}$.

For example, the hardness is:
 less than 10 kg·f$^{-1}$ for spreadable cheeses according to the type, about 20 kg·f$^{-1}$ for soft cheese, and
about 30 kg·f$^{-1}$ for hard cheeses.

A few physical-chemical conditions of texturing are given by way of examples hereinbelow.

For the obtaining of a soft cheese:
a pH between 4 and 6.5, preferably between 5.0 and 5.5,
a temperature between 15° C. and 40° C., preferably between 20 and 35° C.,
a concentration in NaCl between 0.1% and 2%, preferably between 0.7% and 0.9%,
a dose of coagulant (rennet extract) between 0 g/100 L and 50 g/100 L, preferably between 15 g/100 L and 25 g/100 L,
optionally a dose of gelling agent between 0 to 0.6 kg/100 L, preferably between 0.2 to 0.4 kg/100 L, and a dose of thickening agent from 0 to 4 kg/100 L, preferably between 1.5 and 2 kg/100 L.

For the obtaining of a hard cheese:
a pH between 4 and 6.5, preferably between 5.2 and 5.7,
a temperature between 15° C. and 40° C., preferably between 25 and 40° C.,
a concentration in NaCl between 0.1% and 2%, preferably between 0.7% and 0.9%,
a dose of coagulant (rennet extract) between 0 g/100 L and 50 g/100 L, preferably between 25 g/100 L and 30 g/100 L,
optionally a dose of gelling agent between 0 and 0.6 kg/100 L, preferably between 0.3 and 0.4 kg/100 L, and a dose of thickening agent between 0 and 4 kg/100 L, preferably between 1.5 and 2 kg/100 L.

For the obtaining of a spreadable cheese:
a pH between 4 and 6.5, preferably between 4.8 and 5.2,
a temperature between 15° C. and 40° C., preferably between 15 and 25° C.,
a concentration in NaCl between 0.1% and 2%, preferably between 0.1% and 0.9%,
a dose of coagulant (rennet extract) between 0 g/100 L and 50 g/100 L, preferably between 3 g/100 L and 10 g/100 L,
optionally a dose of gelling agent between 0 and 0.6 kg/100 L, preferably between 0.15 and 0.20 kg/100 L and a dose of thickening agent from 0 to 4 kg/100 L, preferably between 1 and 1.5 kg/100 L.

On an Additional Optional Step of Surface Ripening

The step of manufacturing can comprise a final step D) during which at least one surface maturation microorganism is applied.

Such a microorganism is for example chosen from: *Penicillium camemberti* and/or *Geotrichum candidum*, even *Brevibacterium linens*.

The cheese-based food product is then stored for a sufficient time and in adapted conditions (in particular concerning temperature and time), in such a way as to obtain a development of the surface flora.

More preferably, this cheese-based food product can be left in a ripening room for the growth of surface microorganisms, and this for four to five days and at a temperature between 8° C. and 15° C.

Cheese-Based Food Product—Finished Product

The cheese-based food product obtained as such, at the end of the texturing step C) (even the step of surface ripening D)), can be consumed immediately.

This food product comprises:
a texture coming from the physical-chemical transformation of the texture matrix, and
flavourings (or more generally flavours), coming from the flavouring matrix.

In addition, this cheese-based food product does not contain melting salts.

This textured cheese-based food product can be packaged, then be refrigerated.

In this cheese-based food product, the flavouring microorganisms are:
alive, or
destroyed if necessary, in particular for certain applications (major export distribution, out-of-cold consumption).

In order to keep the microorganisms alive, those skilled in the art are able to adjust the various steps of manufacturing in such a way as to avoid the conditions that can destroy the microorganisms.

Inversely, the destruction of the microorganisms can be obtained by a bias of an adapted sterilisation technology, for example through the application of a time/temperature scale of which the range is between 70° C. and 120° C. for 1 to 10 minutes.

EXAMPLES

1. Example 1

Study of the Influence of the Main Texturing Levers of the Cheese (pH and texturing temperature, dose of coagulant and of NaCl).

Method

Integrated into a technological path, the optimised steps are:
1. Stabilisation: drastic heat treatment of the milk: 93° C. for 3 minutes
2. Fat content/Protein content standardisation=1.2 (skimming in downward phase)
3. Draining: concentration by UF of the standardised milk (fat)
4. Texturing:
Acidification: GDL or lactic acid (produced according to the "NIZO" method)
[Salting: NaCl]
["Ripening" (production of flavourings)] introduced
Levers: pH/temperature/[coagulant], [NaCl]

Result

The 4 main levers that intervene in the texturing of the matrix (pH, temperature, [NaCl] and [coagulant]) were tested alone (carrying out of a range) and combined (given temperature range for a range of pH, with [NaCl] and [coagulant] fixed).

The finished products were analysed via instrumental analyses for Texture Profile (TPA): hardness, adhesiveness, elasticity, cohesion on the LOYD AMETEK (TA1) texture meter.

The hardness results ("firmness" approach of the cheese substantially worked in a first step) are in a range between 3 kg·f$^{-1}$ for a non-renneted product up to 30 kg·f$^{-1}$ for a structured product.

For example for a soft cheese texture, with a pre-cheese of which the VCF is 5.7, the characteristic points of the texturing are:
pH: 5.25
temperature: 25° C.
dose of rennet extract: 0.2 g/L
dose of NaCl: 0.8%
The hardness result on the LOYD AMETEK gives 22 kg·f$^{-1}$.

For a pressed cheese, with a pre-cheese of which the VCF is 6.5:
pH: 5.35
temperature: 35° C.
dose of rennet extract: 0.3 g/L
dose of NaCl: 0.8%
The hardness result on the LOYD AMETEK gives 31 kg·f$^{-1}$.

For a spreadable cheese, with a pre-cheese of which the VCF is 5.1:
pH: 5.00
temperature: 17° C.
dose of rennet extract: 0.05 g/L
dose of NaCl: 0.3%
The hardness result on the LOYD AMETEK gives 8 kg·f$^{-1}$.

The extent of the range is substantial and therefore makes it possible to carry out a n adequate firmness.

2. Example 2

Production of Acid, Management of the pH of Texturing

The inventors also worked on obtaining the texturing pH according to various ways (in order to obtain the best structure).

The texturing pH desired was obtained:
by adding GDL (lyzactone),
by adding hyper-fast acidifying ferments: *Streptococcus thermophilus, Lactobacillus bulgaricus, Lactobacillus helveticus,*
by adding lactic acid prepared according to the "NIZO" method (acidification produced by *Lactobacillus helveticus*) on a concentrated skimmed milk medium at 16% dry matter by adding milk powder (see "The dairy products", 2nd edition, Edition Tec and Doc Lavoisier).

The best texture (the finest) is obtained by adding GDL (progressive acidification kinetics: 20 minutes).

The adding of acid ("NIZO" method by mimicking the GDL kinetics: 20 minutes), and mixing in the blender, gives a pre-whipped product.

The mixture made with a blade rotating at slow speed (60 rpm$^{-1}$) gives the texture that is the closest to that obtained with GDL, not as fine however.

The adding of hyper-fast acidifying ferments makes it possible to obtain the objective pH in 2 hours, but requires precisely managing the maturing temperature and the following of the technological times.

The most flexible and the most reproducible technique concerns the adding of GDL. The closest to a conventional technology consists in adding a ferment but required careful monitoring of the change in the pH, of the temperature-controlled tanks. We therefore recommend adding GDL, with the bacteria of the acidifying yeast able, if desired, to be added subsequently.

3. Example 3

Production of Flavourings

The last part consists in cultivating a microorganism in an adequate medium and according to a appropriate method in order to have it produce flavouring and in order to obtain flavouring matrices.

This "flavouring ferment", mixing microorganisms and aromatic components, is then incorporated into different concentrations (1, 3, 6 and 10% by weight for example, alone or in a mixture) in the cheese (texturing matrix) before texturing.

The finished product preserves the living microorganisms contrary to certain concepts that use for example "Modified Cheese Enzymes" or exogenous flavourings.

Four microorganisms that are strong producers of flavourings were cultivated on appropriate mediums in order to produce different flavours:
*Hafnia alvei* in the skimmed milk with 5 g·L$^{-1}$ of methionine and 10 g·L$^{-1}$ of glucose BHI-YE, at 30° C. and in aerobic biodegradation for 48 hours;
*Yarrovia lipolytica* on UHT cream (at 30%), with 10 g·L$^{-1}$ of glucose/BHI-YE, at 22° C. under stirring 200 rpm for 48 h;
*Propionibacterium* on thermally-treated cheese-making whey, for 48 h;
*Lactococcus lactis* ssp *lactis*, ssp *cremoris* and var *diacetylactis* on skimmed milk enriched to 16% of Dry Matter by skimmed milk powder, for 24 h.

These flavouring matrices (microorganisms and flavourings) were introduced into the texture matrix before acidification, salting and texturing by the most gentle and regular mixing possible, for example in a scraped tank system at 50 rpm (401 STEPHAN tank).

The finished products were tasted by a jury of 11 tasters, with respect to a negative control (without adding flavouring matrix).

The jury assigns a score for aromatic intensity between 0 and 5 to each food product tasted, in which 0 corresponds to a zero aromatic intensity and 5 corresponds to a strong aromatic intensity.

For the perception of the aromatic intensity due to the adding of aromatic ferments *Lactococcus lactis* ssp *lactis*, ssp *cremoris* and var *diacetylactis*, the jury gave a score of:
1.1/5 for the aromatic perception of the control (without adding) and
3.4/5 for the test with 6% "ferment".

The results of gas chromatography coupled with mass spectrometry (GC-MS) give:
250 ppm of diacetyl in the negative control and
450 ppm of diacetyl in the test 6%.

For the adding of *Hafnia* at 6%, *Yarrovia* at 6%, the results are:
1.1/5 for the aromatic intensity of the control and respectively 2.7/5 and 4.1/5 for the 2 tests.

The CG—SM results give:
for the test containing 6% of *Hafnia*:
  60 ppm of diacetyl in the control for 400 ppm in the test,
  0.6 ppm of dimethyl sisulphidee (DMDS) in the control for 150 in the test,
  0.3 ppm of 3-methylbutanol in the control for 874 ppm in the test.
for the test containing 6% *Yarrovia*:
  5 ppm of 2-heptanone in the control for 102 ppm in the test, 2 ppm of methylbutanal in the control for 745 ppm in the test, 200 ppm of hexanoic acid in the control for 1750 ppm in the test.

For the test containing 6% *Propionibacterium*:
210 µg·g$^{-1}$ of C3 in the control for 9000 µg·g$^{-1}$ in the 6% test (4500 µg·g$^{-1}$ for the 3% test).

For the tests containing 2% *Hafnia*, 2% *Yarrovia*, 2% *Propionibacterium* and 2% *Lactococcus lactis* and 3% of each, the results are respectively:
- for C3: 210 µg·g$^{-1}$ in the control compared to 1100 µg·g$^{-1}$ in the 2% tests (and 3500 µg·g$^{-1}$ in the 3% test) i.e. 5 and 17 times more;
- for 1-butanol-2,3-methyl: 4 ppb in the control compared to 60 ppb in the 2% tests (and 95 ppb in the 3% test), i.e. 15 and 24 times more;
- for 2-heptanono: 1.5 ppb in the control compared to 4 ppb in the 2% tests (and 4 ppb in the 3% test) i.e. 2.6 times more;
- for diacetyl: 450 ppb in the control compared to 750 ppb in the 2% test (and 710 ppb in the 3% test) i.e. about 1.6 times more;
- for DMDS: 0.3 ppb in the 2% tests (and 0.8 in the 3% test) compared to 0.12 for the control, i.e. 2.5 and 6.6 times more.

The "*Hafnia alvei*" ferment is characterised by the presence:
- of branched alcohols (2-methylpropanol; 3-methylbutanol and 2-methylbutanol) and a linear alcohol: ethanol,
- of sulphur compounds (mercapto acetone, DMDS, DMTS, DMS and 3-(methylthio)-1-propanol),
- of acetoin and
- of diacetyl.

For information, the alcohols are in general little involved in the flavour of the products as their detection threshold is very high but can intervene in the formation of flavour compounds in particular in the formation of esters.

The "*Yarrovia lipolytica*" ferment is characterised by the presence:
- of acids (piquant and even rancid notes): butanoic, hexanoic and octanoic acid, mainly,
- of methylcetones ("blue" notes): 2-butanone, 2-pentanone, 2-heptanone, 2-nonanone, 2-undecanone and
- of aldehydes (malted notes): 2-methylpropanal, 3-methylbutanal and 2-methylbutanal.

The ferment that combines "*Hafnia alvei*" and "*Yarrovia lipolytica*" has all of the compounds found independently in the "*Hafnia alvei*" ferment and the "*Yarrovia lipolytica*" ferment, but at an intermediate level between the two.

An interesting combination, between the aromatic complexity and the best texture, is the *Lactococcus lactis*, *Hafnia alvei*, *Yarrovia lipolytica* and *Propionibacterium* complex at the concentration of 2% each.

The combination of each one of the elements at 3% gives a more typical taste but a less structured texture.

4. Example 4

Cheese Substitute

4.1. Equipment and Methods

4.1.1. Texture Matrix

A suspension was obtained using 100 g of soy flour and 500 g of water. The mixture was then filtered through a bag filter (diameter of the pores of about a micrometer) in order to obtain a soy juice.

This soy juice was thermally treated at 95° C. for 10 min with gentle stirring, followed by a cooling at 30° C. with continuous stirring.

4.1.2. Aromatic Matrices

5 U of MA (*Lactococcus lactis, cremoris*), 5 U of MD (*Lactococcus lactis, diacetylactis+leuconostoc cremoris*), 5 U of MY (*Streptococcus thermophilus* and *Lactobacillus delbrueckii lactis*) were diluted separately in 3 times 1 L of distilled water.

A soy juice (also referred to as "soy milk"), was incubated with the dilutions MA, MD and MY:
- MA and MD, cultivated at 30° C. for 29 h,
- MY, cultivated at 40° C. for 29 h in order to obtain three "plant" flavouring matrices.

4.1.3. Texturing

A cheese substitute was prepared on the laboratory scale by the mixing of the texture matrix with:
- 2% by weight in GDL,
- 3% by weight in MA,
- 3% by weight in MD, and
- 3% by weight in MY.

The cheese substitute is stored in a refrigerator (4-5° C.) before GC-MS analyses and sensory evaluation.

A control product was obtained by coagulation of a soy juice starting at 2% by weight GDL.

4.1.4. Analysis of Volatile Compounds 2.5 g of product were placed in a 22 ml vial and immediately sealed with a stopper and a septum hermetically sealed to the volatile compounds. The vials were then frozen at −80° C. until the time of the analysis. Also the frozen samples were placed on the passer in pairs, 30 to 90 minutes before analysis with the purpose of preventing an excessive change in these samples containing a bacterial flora.

The volatile compounds of the head area of the samples are driven by a current of helium, trapped, then desorbed and separated by gas phase chromatography (CPG). They are then qualified and identified by mass spectrometry (MS).

4.1.5. Sensory Evaluation

The sensory panel was comprised of 14 people. The jury expressed its opinion for the following sensory characteristics: appearance, texture in the mouth, colour, flavour, odour and overall acceptability.

4.2. Results

4.2.1. Volatile Compounds of the Final Product

By using the GC-MS in order to determine the volatile compounds of the cheese substitute obtained, 35 volatile molecules were found belonging predominantly to aldehydes, ketones of alcohols and of acids.

The flavouring matrix MA is characterised by a greater quantity of aldehydes (5.47E+09). The flavouring matrix MD produced more ketones (1.90E+10) and acids (3.33E+10). The flavouring matrix MY produced more alcohols (9.33E+09).

The final product is especially rich in aldehydes.

4.2.2. Sensory Evaluation

The scores for the colour and the appearance, which were the first decisive factors in order to determine the acceptation or the rejection of a product.

There was not any significant difference on the appearance and the colour (P>0.05) between the final product and the control product.

All of the samples had the similar creamy white colour.

The sensory acceptability of the texture, which was perceived by the sensation in the mouth, was a determining factor of the acceptability of the product for the consumers.

The jury preferred the cheese substitute according to the invention (obtained by adding the flavouring ex situ).

4.3 Conclusion

It has been shown that soy juice has the sugars required for the development of MA, MD, MY. The ferments were able not only to give the flavouring to the cheese substitute, but also played a role of coagulant (acidified soy juice) during the manufacture of the final product.

The cheese substitute, obtained by the "ex situ" flavouring, is preferred. Volatile compounds produced by the lactic bacteria, during the fermentation, were characterised.

The invention claimed is:

1. A method for manufacturing a cheese comprising:
cultivating at least one microorganism in a culture medium consisting of milk or a product obtained from milk to obtain a flavouring matrix;
providing a dairy product for filtering that has not been subjected to a prior coagulation, including native casein in the shape of micelles and able to coagulate to form a gel;
filtering the dairy product to obtain a retentate comprising 5% to 25% by weight protein and 3% to 30% by weight fat, with the protein not subjected to a step of destructuring and including the native casein in the shape of micelles and able to coagulate to form a gel, wherein the filtration technique implemented is chosen from the techniques of ultrafiltration, microfiltration, and nanofiltration, associated or not with diafiltration;
mixing the retentate and the at least one flavouring matrix, with the flavouring matrix being 0.5 to 50% by weight of the total mixture, limits included, and wherein the at least one microorganism in the flavouring matrix is alive, wherein said at least one microorganism from the flavouring matrix remains alive in the mixture and wherein the mixture is devoid of melting salts; and, following the completion of the mixing;
salting the mixture; and
coagulating the protein both:
(1) enzymatically using rennet, and
(2) acid coagulation by either (2)(i) fermentation or (2)(ii) chemically using acid to adjust the pH,
wherein the coagulating is within the following parameters:
pH of 4-6.5,
temperature of 15° C.-50° C.,
NaCl concentration of 0.1-2%, and
a dose of rennet extract between 3 g/100 L and 50 g/100 L,
thereby forming a casein gel constituting the cheese,
wherein said cheese is devoid of melting salts, and
wherein said at least one microorganism from the flavouring matrix remains alive after coagulating the protein.

2. The method for manufacturing a cheese according to claim 1 wherein the retentate obtained from filtering the dairy product is comprising 9% to 25% by weight protein.

3. The method for manufacturing a cheese according to claim 1 wherein the at least one microorganism is selected from the group consisting of *Lactobacillus rhamnosus, Lactobacillus paracasei, Lactobacillus fermentum Lactococcus lactis, Lactococcus cremoris, Lactococcus diacetylactis, Propionibacterium, Hafnia alvei*, and *Yarrovia lipolytica*.

4. The method for manufacturing a cheese according to claim 1 wherein the flavouring matrix is 0.5 to 10% by weight of the total mixture.

5. A method for manufacturing a cheese, having a soft cheese texture, comprising:
cultivating each of *Hafnia, Yarrovia, Propionibacterium* and *Lactococcus lactis* in culture medium consisting of milk or a product obtained from milk to obtain respective flavouring matrix;
providing a dairy product for filtering that has not been subjected to a prior coagulation, including native casein in the shape of micelles and able to coagulate to form a gel, wherein fat content/protein content is standardised at 1.2 by skimming in downward phase,
filtering the dairy product to obtain a retentate comprising 5% to 25% by weight protein and 3% to 30% by weight fat, with the protein not subjected to a step of destructuring and including the native casein in the shape of micelles and able to coagulate to form a gel, wherein the filtration technique implemented is ultrafiltration, whereof the volume concentration factor is 5.7;
mixing the retentate and 2% of each of respective flavouring matrix, with the flavouring matrix being 0.5 to 50% by weight of the total mixture, limits included, and wherein the microorganisms in the flavouring matrix are alive, wherein said microorganisms from the flavouring matrix remain alive in the mixture and wherein the mixture is devoid of melting salts; and, following the completion of the mixing;
salting the mixture; and
coagulating the protein both:
(1) enzymatically using rennet, and
(2) acid coagulation by either (2)(i) fermentation or (2)(i) chemically using acid to adjust the pH,
wherein the coagulating is within the following parameters:
pH: 5.25
temperature: 25° C.
dose of rennet extract: 0.2 g/L
dose of NaCl: 0.8%.

6. The method for manufacturing a cheese according to claim 1, wherein, in the parameters for the step of salting the mixture and coagulating the protein, the temperature is 15° C.-40° C. and the dose of rennet extract is between 3 g/100 L and 10 g/100 L.

7. The method for manufacturing a cheese according to claim 1, wherein, in the parameters for the step of salting the mixture and coagulating the protein, the temperature is 15° C.-40° C. and the dose of rennet extract is between 15 g/100 L and 25 g/100 L.

8. The method for manufacturing a cheese according to claim 1, wherein, in the parameters for the step of salting the mixture and coagulating the protein, the temperature is 15° C.-40° C. and the dose of rennet extract is between 25 g/100 L and 30 g/100 L.

* * * * *